(12) United States Patent
Kelly

(10) Patent No.: US 11,566,427 B2
(45) Date of Patent: Jan. 31, 2023

(54) ENHANCED ROOFING SYSTEM

(71) Applicant: Thomas L. Kelly, Waterbury, CT (US)

(72) Inventor: Thomas L. Kelly, Waterbury, CT (US)

(*) Notice: Subject to any disclaimer, the term of this patent is extended or adjusted under 35 U.S.C. 154(b) by 0 days.

(21) Appl. No.: 16/415,418

(22) Filed: May 17, 2019

(65) Prior Publication Data

US 2019/0352908 A1 Nov. 21, 2019

Related U.S. Application Data

(60) Provisional application No. 62/673,570, filed on May 18, 2018.

(51) Int. Cl.

| E04D 3/36 | (2006.01) |
|---|---|
| E04D 3/02 | (2006.01) |
| E04B 1/94 | (2006.01) |
| E04D 3/30 | (2006.01) |
| E04G 21/24 | (2006.01) |
| B29C 44/24 | (2006.01) |
| E04D 3/35 | (2006.01) |
| E04D 5/14 | (2006.01) |
| E04D 3/365 | (2006.01) |
| E04D 13/12 | (2006.01) |

(52) U.S. Cl.
CPC ............ *E04D 3/3608* (2013.01); *B29C 44/24* (2013.01); *E04B 1/942* (2013.01); *E04D 3/02* (2013.01); *E04D 3/30* (2013.01); *E04D 3/351* (2013.01); *E04D 3/352* (2013.01); *E04D 3/365* (2013.01); *E04D 5/145* (2013.01); *E04G 21/24* (2013.01); *E04D 13/12* (2013.01)

(58) Field of Classification Search
CPC ....... E04D 3/3608; E04D 3/365; E04D 3/352; E04D 5/145; E04D 3/351; E04D 3/30; E04D 3/02; E04D 13/12; B29C 44/24; E04G 21/24; E04B 1/942
See application file for complete search history.

(56) References Cited

U.S. PATENT DOCUMENTS

| 3,209,502 | A |   | 10/1965 | Donegan |
|---|---|---|---|---|
| 3,397,497 | A |   | 8/1968 | Shea et al. |
| 3,468,086 | A |   | 9/1969 | Warner |
| 3,958,373 | A |   | 5/1976 | Stewart et al. |
| 3,965,633 | A | * | 6/1976 | Carroll ...................... E04B 7/00 |
|   |   |   |   | 52/309.8 |
| 3,984,270 | A |   | 10/1976 | Haage |
| 4,021,981 | A |   | 5/1977 | Van Wagoner |
| 4,063,395 | A |   | 12/1977 | Stewart et al. |
| 4,073,997 | A |   | 2/1978 | Richards et al. |
| 4,192,116 | A |   | 3/1980 | Kelly |
| 4,223,486 | A |   | 9/1980 | Kelly |
| 4,282,697 | A |   | 8/1981 | Spielau et al. |
| 4,348,846 | A | * | 9/1982 | Bellem ................... E04D 3/362 |
|   |   |   |   | 52/410 |

(Continued)

OTHER PUBLICATIONS

U.S. Final Office Action; U.S. Appl. No. 16/415,421; filed May 17, 2019; dated Jul. 30, 2020; 24 pages.

(Continued)

*Primary Examiner* — Joshua K Ihezie
(74) *Attorney, Agent, or Firm* — Cantor Colburn LLP

(57) ABSTRACT

A roof system includes a roof deck, a weighted cover board disposed upwardly adjacent the roof deck and a plurality of fasteners coupling the weighted cover board to the roof deck.

11 Claims, 7 Drawing Sheets

(56) References Cited

U.S. PATENT DOCUMENTS

| | | | | |
|---|---|---|---|---|
| 4,382,353 | A | 5/1983 | Kelly | |
| 4,424,650 | A | 1/1984 | Van Note | |
| 4,441,295 | A * | 4/1984 | Kelly | E04D 3/3603 52/309.8 |
| 4,450,663 | A | 5/1984 | Watkins | |
| 4,535,579 | A | 8/1985 | Burgoyne et al. | |
| 4,601,151 | A * | 7/1986 | Nunley | E04D 3/3601 219/127 |
| 4,642,950 | A | 2/1987 | Kelly | |
| 4,688,361 | A | 8/1987 | Kelly | |
| 4,707,961 | A | 11/1987 | Nunley et al. | |
| 4,736,561 | A * | 4/1988 | Lehr | E04D 11/02 52/199 |
| 4,783,942 | A | 11/1988 | Nunley et al. | |
| 4,862,664 | A * | 9/1989 | Romine | E04D 3/3603 52/410 |
| 4,936,071 | A | 6/1990 | Karrfalt | |
| 4,937,990 | A | 7/1990 | Paquette | |
| 4,996,803 | A | 3/1991 | Karrfalt et al. | |
| 5,088,259 | A * | 2/1992 | Myers | E04D 11/02 52/309.8 |
| 5,168,684 | A * | 12/1992 | Bruhm | E04D 3/3603 411/542 |
| 5,392,583 | A | 2/1995 | Gregory | |
| 5,584,153 | A * | 12/1996 | Nunley | E04D 3/3602 52/309.2 |
| 5,720,147 | A | 2/1998 | Wenrick et al. | |
| 5,740,647 | A | 4/1998 | Kelly | |
| 5,749,954 | A | 5/1998 | Law et al. | |
| 5,784,846 | A | 7/1998 | Godschalx | |
| 5,884,446 | A | 3/1999 | Hageman | |
| 5,950,383 | A * | 9/1999 | Williamson | E04D 3/38 52/408 |
| 6,006,482 | A | 12/1999 | Kelly | |
| 6,092,344 | A | 7/2000 | Kelly | |
| 6,108,993 | A | 8/2000 | Hageman | |
| 6,250,036 | B1 * | 6/2001 | Nurley | E04D 3/3606 52/408 |
| 6,256,957 | B1 * | 7/2001 | Kelly | E04D 11/02 52/309.12 |
| 6,581,348 | B2 | 6/2003 | Hunter, Jr. | |
| 6,751,923 | B1 | 6/2004 | Nunley | |
| 7,168,221 | B2 | 1/2007 | Hunter, Jr. | |
| 7,234,284 | B2 | 6/2007 | Paradise et al. | |
| 7,493,733 | B2 | 2/2009 | Kelly | |
| 7,610,729 | B1 | 11/2009 | Ayers, Jr. | |
| 7,841,148 | B2 * | 11/2010 | Tonyan | B28B 1/522 106/735 |
| 7,849,648 | B2 * | 12/2010 | Tonyan | E04B 5/04 106/735 |
| 8,136,319 | B2 * | 3/2012 | Kelly | E04D 11/02 52/408 |
| 9,702,155 | B2 * | 7/2017 | Nunley | E04G 23/0281 |
| 10,731,346 | B2 | 8/2020 | Kelly | |
| 10,808,405 | B2 | 10/2020 | Kelly | |
| 2001/0029718 | A1 | 10/2001 | Snyder et al. | |
| 2002/0189185 | A1 | 12/2002 | Hunter, Jr. | |
| 2003/0082365 | A1 | 5/2003 | Geary et al. | |
| 2003/0165669 | A1 | 12/2003 | Nowak et al. | |
| 2004/0200154 | A1 | 10/2004 | Hunter, Jr. | |
| 2005/0035484 | A1 | 2/2005 | Meyers, III et al. | |
| 2005/0102939 | A1 | 5/2005 | Kelly | |
| 2005/0126099 | A1 | 6/2005 | Kelly | |
| 2006/0053702 | A1 | 3/2006 | Kelly | |
| 2006/0053717 | A1 | 3/2006 | Kelly | |
| 2006/0053718 | A1 | 3/2006 | Kelly | |
| 2006/0096205 | A1 | 5/2006 | Griffin et al. | |
| 2006/0144005 | A1 * | 7/2006 | Tonyan | E04B 5/04 52/653.1 |
| 2006/0191223 | A1 * | 8/2006 | Bontrager | E04D 11/02 52/411 |
| 2006/0254207 | A1 | 11/2006 | Mulligan | |
| 2007/0193157 | A1 | 8/2007 | Kelly | |
| 2007/0203262 | A1 | 8/2007 | Crossley | |
| 2007/0261346 | A1 | 11/2007 | Kelly | |
| 2008/0050565 | A1 | 2/2008 | Gross et al. | |
| 2008/0282632 | A1 | 11/2008 | Sleeman | |
| 2009/0104407 | A1 | 4/2009 | Johnson et al. | |
| 2009/0255201 | A1 | 10/2009 | Kraus, Jr. et al. | |
| 2010/0136318 | A1 | 6/2010 | Letts et al. | |
| 2010/0192497 | A1 | 8/2010 | Kelly | |
| 2010/0199584 | A1 | 8/2010 | Kalkanoglu et al. | |
| 2010/0239816 | A1 | 9/2010 | Kinkade | |
| 2011/0200807 | A1 | 8/2011 | Shofner et al. | |
| 2013/0164524 | A1 | 6/2013 | Letts et al. | |
| 2014/0072808 | A1 | 3/2014 | Peng | |
| 2014/0083028 | A1 | 3/2014 | Richardson | |
| 2014/0102556 | A1 | 4/2014 | Malpas | |
| 2014/0130435 | A1 | 5/2014 | Paradis et al. | |
| 2015/0129016 | A1 | 5/2015 | Richardson | |
| 2016/0010335 | A1 | 1/2016 | Kelly | |
| 2016/0010336 | A1 * | 1/2016 | Kelly | E04D 3/02 52/408 |
| 2016/0201346 | A1 | 7/2016 | Nunley et al. | |
| 2017/0292271 | A1 | 10/2017 | Wu et al. | |
| 2018/0266111 | A1 | 9/2018 | Kelly | |
| 2019/0077700 | A1 | 3/2019 | Xu et al. | |
| 2019/0352907 | A1 | 11/2019 | Kelly | |
| 2019/0352909 | A1 | 11/2019 | Kelly | |
| 2019/0352910 | A1 | 11/2019 | Kelly | |
| 2019/0352911 | A1 | 11/2019 | Kelly | |

OTHER PUBLICATIONS

U.S. Final Office Action; U.S. Appl. No. 16/415,425; filed May 17, 2019; dated Jul. 30, 2020; 18 pages.

U.S. Non-Final Office Action; U.S. Appl. No. 16/415,436; filed May 17, 2019; dated Aug. 7, 2020; 19 pages.

U.S. Non-Final Office Action; U.S. Appl. No. 16/415,421; filed May 17, 2019; dated Mar. 17, 2020; 20 pages.

U.S. Non-Final Office Action; U.S. Appl. No. 16/415,425; filed May 17, 2019; dated Mar. 17, 2020; 24 pages.

U.S. Non-Final Office Action; U.S. Appl. No. 16/415,440; filed May 17, 2019; dated Mar. 4, 2020; 11 pages.

U.S. Final Office Action; U.S. Appl. No. 16/415,436; filed May 17, 2019; dated Jan. 13, 2021; 16 pages.

U.S. Final Office Action; U.S. Appl. No. 16/415,440; filed May 17, 2019; dated Sep. 17, 2020; 24 pages.

Kemp, Samantha. "Weight of Poly Roof Insulation Board." HomeSteady, The Average Per-Square-Foot Cost of Foam Insulation, Sep. 26, 2017, pp. 1-10, homesteady.com/13416892/the-average-per-square-foot-cost-of-foam-insulation. Date Accessed: Feb. 8, 2021.

U.S. Final Office Action; U.S. Appl. No. 16/415,421; filed May 17, 2019; dated Feb. 10, 2021; 29 pages.

U.S. Final Office Action; U.S. Appl. No. 16/415,425; filed May 17, 2019; dated Mar. 25, 2021; 24 pages.

U.S. Non-Final Office Action; U.S. Appl. No. 16/415,421; filed May 17, 2019; dated May 24, 2021; 20 pages.

U.S. Final Office Action; U.S. Appl. No. 16/415,421; filed May 17, 2019; dated Sep. 7, 2021; 15 pages.

U.S. Non-Final Office Action; U.S. Appl. No. 16/415,425; filed May 17, 2019; dated Jul. 19, 2021; 21 pages.

U.S. Final Office Action; U.S. Appl. No. 16/415,425; filed May 17, 2019; dated Dec. 13, 2021 17 pages.

U.S. Non-Final Office Action; U.S. Appl. No. 16/415,425; filed May 17, 2019; dated Mar. 7, 2022; 21 pages.

U.S. Notice of Allowance; U.S. Application No. 16/415/421; filed May 17, 2019; dated Jan. 26, 2022; 14 pages.

Elemental Green "Rewall 100% Recycled High Performance Roof and Wall Materials" (https://elemental green/rewall-recycled-high-performance-roof-and-wall-materials/) (Published Feb. 25, 2015) (Accessed 6/15/2922) (Year: 2015).

U.S. Final Office Action; U.S. Appl. No. 16/415,425; dated Jun. 20, 2022; 30 pages.

* cited by examiner

ENHANCED ROOFING SYSTEM

CROSS REFERENCE TO RELATED APPLICATIONS

This application claims the benefit of U.S. Provisional Application Ser. No. 62/673,570 filed May 18, 2018, which is incorporated herein by reference in its entirety.

BACKGROUND

Exemplary embodiments of the invention relate to a roof system, and more particularly, to a roof system suitable to meet the 2016 Wind Code applicable to roofing systems.

Roof structures have been made for millennia ranging from simple lean-to thatched arrangements to more modern buildings having multiple layers of roofing materials, fire harriers, vapor barriers, air retarders, rigid roof insulations, cover boards, slipsheets and waterproofing membranes all designed to work together to keep the elements away from occupants of the building. Roof structures continue to be improved because each of the systems currently available has drawbacks and improvements are therefore desirable. Typical problems with roof structures relate to wind uplift resistance, energy efficiency with insulations for heat and cold resistance to maintain internal building temperature, as well as time and effort required to install the roof system. Due to changes in the code regarding wind uplift resistance, some conventional roof systems are not capable of meeting these increase requirements.

BRIEF SUMMARY OF THE INVENTION

According to one embodiment of the disclosure, a roof system includes a roof deck, a weighted cover board disposed upwardly adjacent the roof deck and a plurality of fasteners coupling the weighted cover board to the roof deck.

According to another embodiment, a method of forming a roof system s installing a roof deck, positioning a weighted cover board upwardly adjacent a roof deck, and fastening the weighted cover hoard to the roof deck with a plurality of fasteners.

According to another embodiment, a roof system includes a roof deck and a layer of weighted cover board disposed upwardly adjacent the roof deck. The layer of weighted cover board includes a plurality of panels of weighted cover board and a plurality of joints is formed between adjacent panels of weighted cover board. A sealant is arranged at the plurality of joints formed between adjacent panels of weighted cover board.

According to yet another embodiment, a method of forming a roof system includes installing a roof deck, positioning a layer of weighted cover board upwardly adjacent a roof deck. The layer of weighted cover board includes a plurality of panels of weighted cover board such that a plurality of joints is formed between adjacent panels of weighted cover board. The method additionally includes sealing the plurality of joints formed between adjacent panels of the weighted cover board.

According to another embodiment, a roof system includes a roof deck, a layer of weighted cover hoard disposed upwardly adjacent the roof deck, and an adhesive arranged at an upper surface of the roof deck for coupling the layer of weighted cover board to the roof deck.

According to another embodiment, a method of forming a roof system includes installing a roof deck. The roof deck includes a plurality of fluted panels arranged in an overlapping relationship and each of the plurality of fluted panels has at least one upper flute and at least one lower flute. The method additionally includes applying an adhesive to at least one of the roof deck and a layer of weighted cover hoard and positioning the layer of weighted cover hoard upwardly adjacent the roof deck such that the adhesive couples the layer of weighted cover board to the roof deck.

According to another embodiment, a roof system includes a roof deck, a weighted cover board disposed upwardly adjacent the roof deck, and a sealant assembly applied to the roof deck such that the roof deck forms an air barrier.

According to yet another embodiment, a method of forming a roof system includes installing a roof deck. The roof deck includes a plurality of fluted panels arranged in an overlapping and/or nested relationship. Each of the plurality of fluted panels has at least one upper flute and at least one lower flute. The method further includes positioning a layer of weighted cover board upwardly adjacent the roof deck and seating the roof deck to form an air barrier.

According to another embodiment, a roof system includes a roof deck, a first layer of weighted cover board disposed upwardly adjacent the roof deck, one or more layers of insulation positioned upwardly adjacent said first layer of weighted cover board, and a second layer of weighted cover board disposed upwardly adjacent the one or more layers of insulation. The second layer of weighted cover board comprises a plurality of panels of weighted cover board such that a plurality of joints is formed between adjacent panels of the weighted cover board. A sealant is arranged at the plurality of joints formed between adjacent panels of the second layer of weighted cover board.

According to yet another embodiment, a method of forming a roof system includes installing a roof deck, positioning a first layer of weighted cover board upwardly adjacent the roof deck, positioning one or more layers of insulation in overlapping arrangement with the first layer of weighted cover board, positioning a second layer of weighted cover hoard upwardly adjacent the one or more layers of insulation, the second layer of weighted cover board comprising a plurality of panels of weighted cover board such that a plurality of joints are formed between adjacent panels of the second layer of weighted cover hoard, and sealing the plurality of joints of the second layer of weighted cover board.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION

Figure 1:
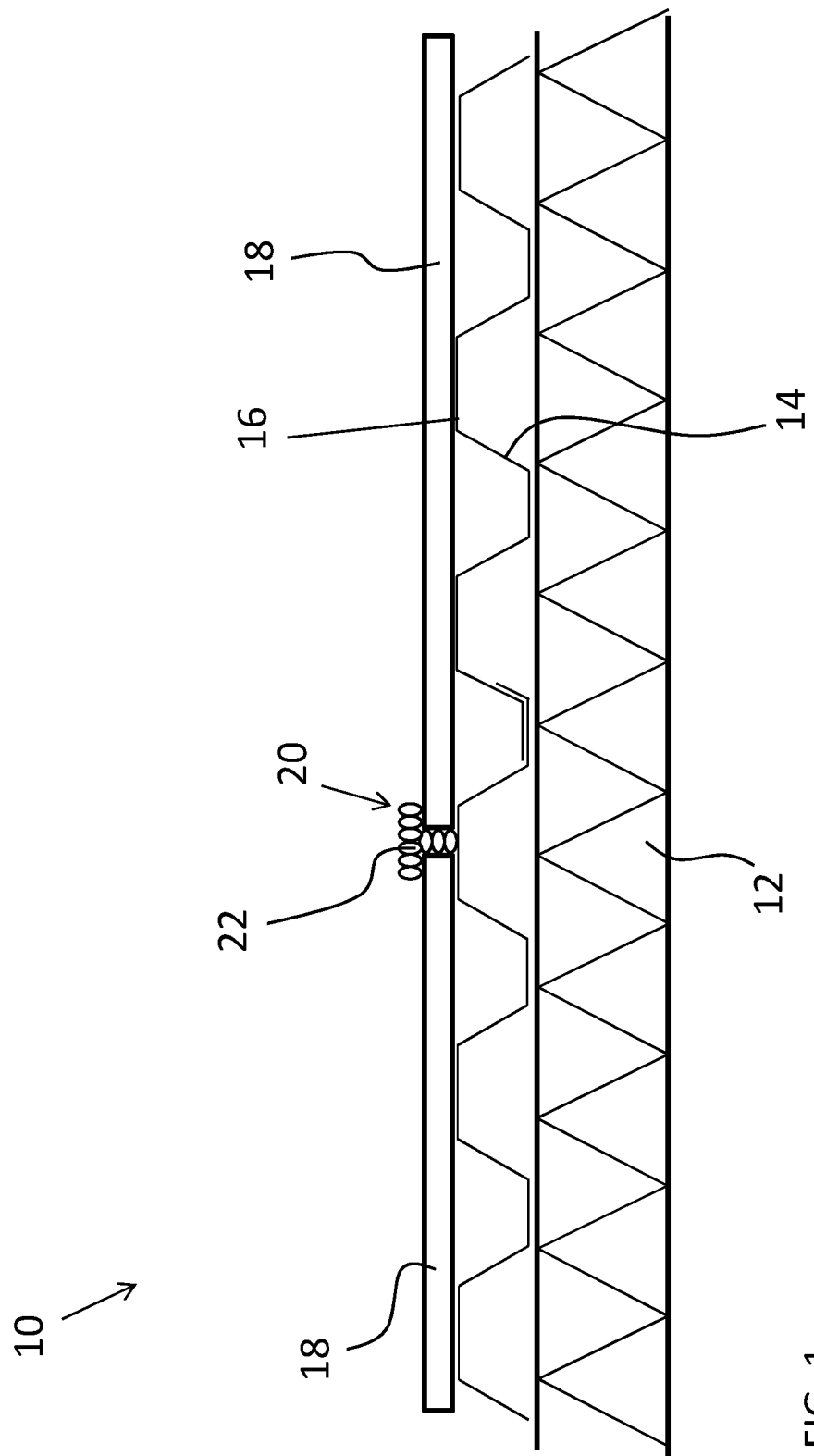
FIG. 1 is a cross-sectional view of a roof system according to an embodiment.

Referring now to FIG. 1, an example of a roof system 10 as taught herein is illustrated. The roof system 10 includes a truss 12 or another structural support. The truss 12 is suitably supported by a building structure (not shown) that is not relevant to the roof system disclosed herein, and therefore need not be described or illustrated. A roof deck 14, such as a corrugated metal deck for example, is arranged upwardly adjacent the truss 12, and is therefore supported by the truss 12. It should be understood that other types of decks, such as wooden, composite plank, precast, and poured in place decks are also within the scope of the disclosure. In the illustrated, non-limiting embodiment, the deck 14 is constructed from multiple corrugated panels, each having a plurality of flutes including an upper flute and a lower flute. Adjacent panels of the deck 14 are configured to "nest" with one another by a distance of about 2-4 inches along a direction parallel to the longitudinal axis defined by each flute. Alternatively, or in addition, one or more flutes arranged at the ends of adjacent panels are in an overlapping arrangement as shown in the FIGS. The deck 14, as described herein, extends over the entire roof structure of the building.

In the illustrated, non-limiting embodiment, a layer of weighted cover board 18 is positioned directly adjacent an upper surface of the deck 14. The weighted cover board 18 has a substantially uniform weight across the entire roofing system, regardless of its position relative to a perimeter thereof. The weight of the cover board 18 is generally between about 1 pound per square foot and about 25 pounds per square foot. The weight of the cover board 18 may vary in part based on the thickness of the cover board, and is selected based on the intended application of the cover board. The weighted cover board 18 may additionally have properties such that it holds its shape, even while being pulled non-uniformly by attachments to the roof and building structures for example. Because of this tendency to retain its shape, the cover board 18 evenly distributes loads applied thereto to minimize localized stress levels.

The cover board 18 generally comprises one or more of plywood, oriented strand board, gypsum, rigid fiber board, cement board or other relatively heavy solid board material for example. In an embodiment, the cover board 18 is Kelly Green Board manufactured by Kelly Green Products. In such embodiments, the cover board 18 is formed from a moisture and mold composite material. In an embodiment, the composite material is formed entirely from recycled materials, such as beverage cartons and cups for example. Because Kelly Green Board is formed without the use of formaldehyde glues, or other hazardous chemicals, the cover board 18 is free from volatile organic compounds. In an embodiment, the cover board 18 may have fire-resistant properties such that the cover board 18 may function as a fire barrier, Alternatively, or in addition, the cover hoard 18 may be water-resistant or waterproof.

The layer of weighted cover board 18 typically comprises a plurality of substantially identical panels laid adjacent one another to form a plurality of joints 20. However, embodiments comprising a single panel of weighted cover board are also contemplated herein. With reference to FIG. 1, in the illustrated, non-limiting embodiment, the one or more panels of cover board 18 are "loosely laid" over the upper surface of the deck 14. The term "loosely laid" is understood by a person having ordinary skill in the art to described embodiments where the cover board 18 is not adhered or mechanically affixed to the adjacent surface of the deck 14.

In addition, a sealant 22 is positioned in the joints 20 formed between adjacent panels of the cover board 18. The sealant 22 may be any suitable type of sealant, including a silicon roof coating for example. In an embodiment, the sealant 22 blocks the flow of air through the joints 20 between adjacent panels of cover board 18. Because the cover board 18 is formed from an impervious material through which air cannot flow, together the layer of cover board 18 and the sealant 22 positioned in the joints 20 form an air barrier. In some embodiments, a roof system 10, such as the one illustrated and described in FIG. 1 is operable as a "temporary roof structure" during completion of the roof system 10.

Figure 2:
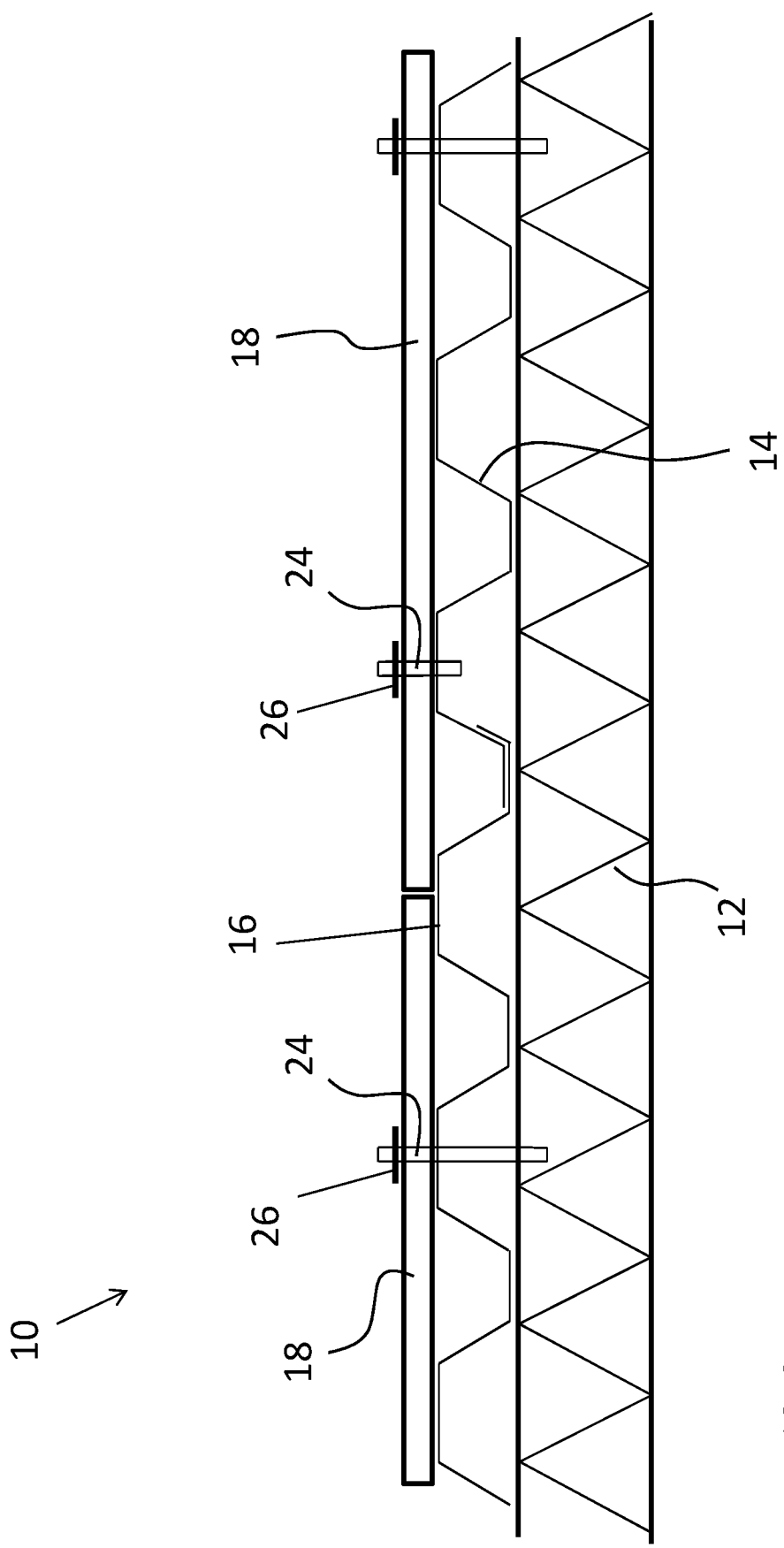
FIG. 2 is a cross-sectional view of another roof system according to an embodiment.

With reference now to FIG. 2, the roof system 10 may further comprise a plurality of fasteners 24 to mechanically fasten the plurality of panels of cover board 18 to the roof system. The plurality of fasteners 24, may be used as an alternative to, or in addition to the sealant described with reference to FIG. 1. In an embodiment, at least one of the plurality of fasteners 24 is sized to extend through the cover board 18 to the deck 14. In another embodiment, at least one of the plurality of fasteners 24 is configured to extend through the cover board and the deck 14 to the truss 12. The fasteners 24 may be positioned to align with and extend through the upper flutes 16 of the deck 14 and may be positioned at intervals, such as every six inches on center for example along the longitudinal axis defined by the upper flutes.

In an embodiment, the fasteners 24 are self-drilling or self-tapping screws, such as a TEK® screws for example. The roof system 10 including a plurality of fasteners 24 provides a load per square foot of uplift resistance of about 200 lb/sq. ft. In embodiments where the cover board 18 is Kelly Green Board, the heat generated during installation of the fasteners 24 causes the material of the cover board 18 adjacent each fastener hole to melt. The melted material then flows toward the opening and the fastener 24 positioned therein. As a result, the Kelly Green Board can be considered to have "self-sealing" qualities.

A washer 26, such as a fender washer for example, may, but need not be, positioned between the head of each fastener 24 and the adjacent surface of the cover board 18 to increase the allowable load per square foot in uplift resistance up to about 5000 lb/sq. ft. It should be understood that the illustrated and described roof system 10 may be used when installing a new roof or during reroofing operations. For reroofing, the existing roofing system is stripped down to the roof deck and the roof deck is structurally refastened with another deck, in this instance the cover board.

Figure 3:
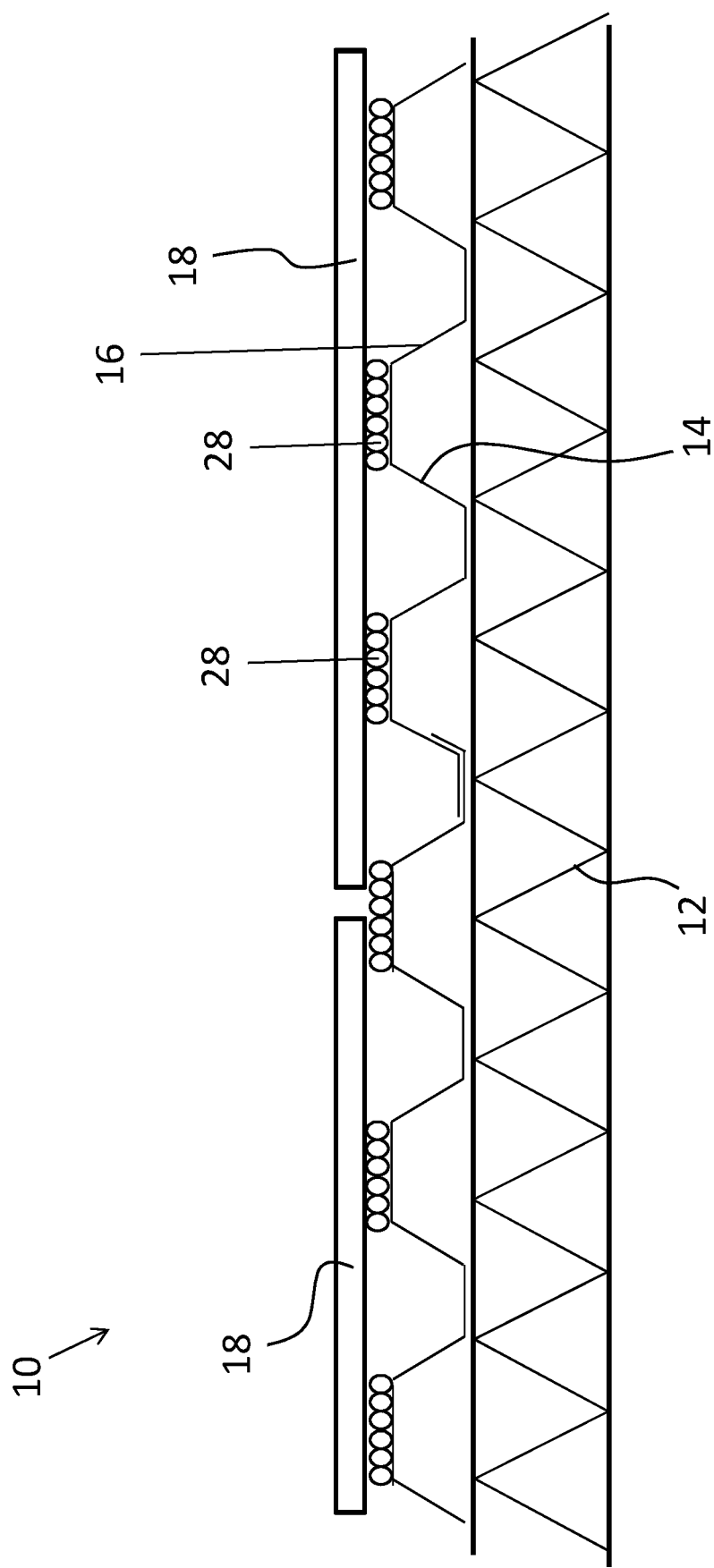
FIG. 3 is a cross-sectional view of another roof system according to an embodiment.

With reference now to FIG. 3, another embodiment of a roof system 10 is illustrated. Similar to the system of FIGS. 1 and 2, the system 10 includes a truss 12, a deck 14 layered adjacent an upper surface of the truss 12, and a layer of weighted cover hoard 18 positioned upwardly adjacent the deck 14. In the illustrated, non-limiting embodiment, an adhesive material 28 is positioned between the deck. 14 and the weighted cover board 18 to couple the cover board 18 to the deck 14. As shown, the adhesive 28 may be positioned on an upper surface of each of the upper flutes 16 of the deck 14 configured to contact the cover board 18. The adhesive 28 may be a sealant, such as a silicone sealant for example. Use of a silicone sealant provides the added benefits of being inflammable and not being affected by cold temperatures. However it should be understood that other materials, such as a urethane adhesive or any suitable alternative material are also within the scope of the disclosure. The adhesive 28 between the cover board 18 and the deck 14 provides structural shear and diaphragm forces resulting in increased wind uplift resistance, and therefore greater loading capability.

The adhesive 28 may be used as an alternative to, or in addition to the sealant 22 and/or fasteners 24, illustrated and described in FIGS. 1 and 2. In an embodiment, illustrated in FIG. 4, the roof system 10 additionally includes a sealant 22 positioned within the joints 20 formed between adjacent panels of the cover board 18. The sealant 22 positioned between the joints 20 of the cover hoard 18 may be the same material as the adhesive 28 used to adhere the panels of cover board 18 to the deck 14. However, embodiments where the sealant 22 is a different material than the adhesive 28 are also contemplated herein. Further, embodiments where the joints 20 do not include a sealant 22 are also contemplated herein.

Figure 4:
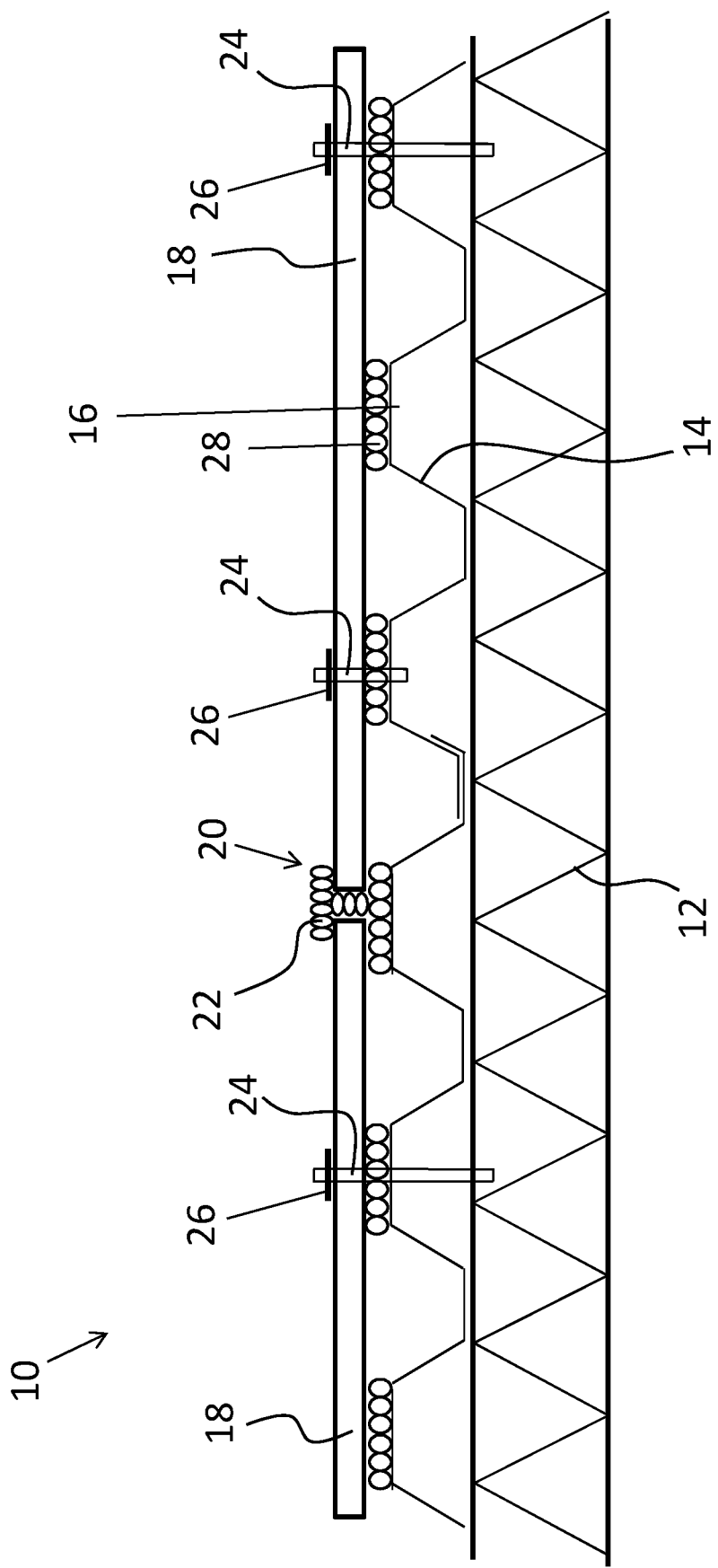
FIG. 4 is a cross-sectional view of another roof system according to an embodiment.

In embodiments where the cover hoard 18 is coupled to the deck 14 via an adhesive 28, fasteners extending through the cover board 18, deck 14, and truss 12 are not required. However, in some embodiments, such as shown in FIG. 4 for example, a plurality of fasteners 24 may additionally be used to couple the cover board 18 to the deck 14, and in some embodiments the truss 12, for added strength and wind uplift resistance. Any of the roof systems 10, illustrated and described in FIGS. 1-4 can function as a "temporary roof structure" during completion of the roof system 10. Further, such roof systems 10 may be created during a re-roofing operation.

Figure 5:
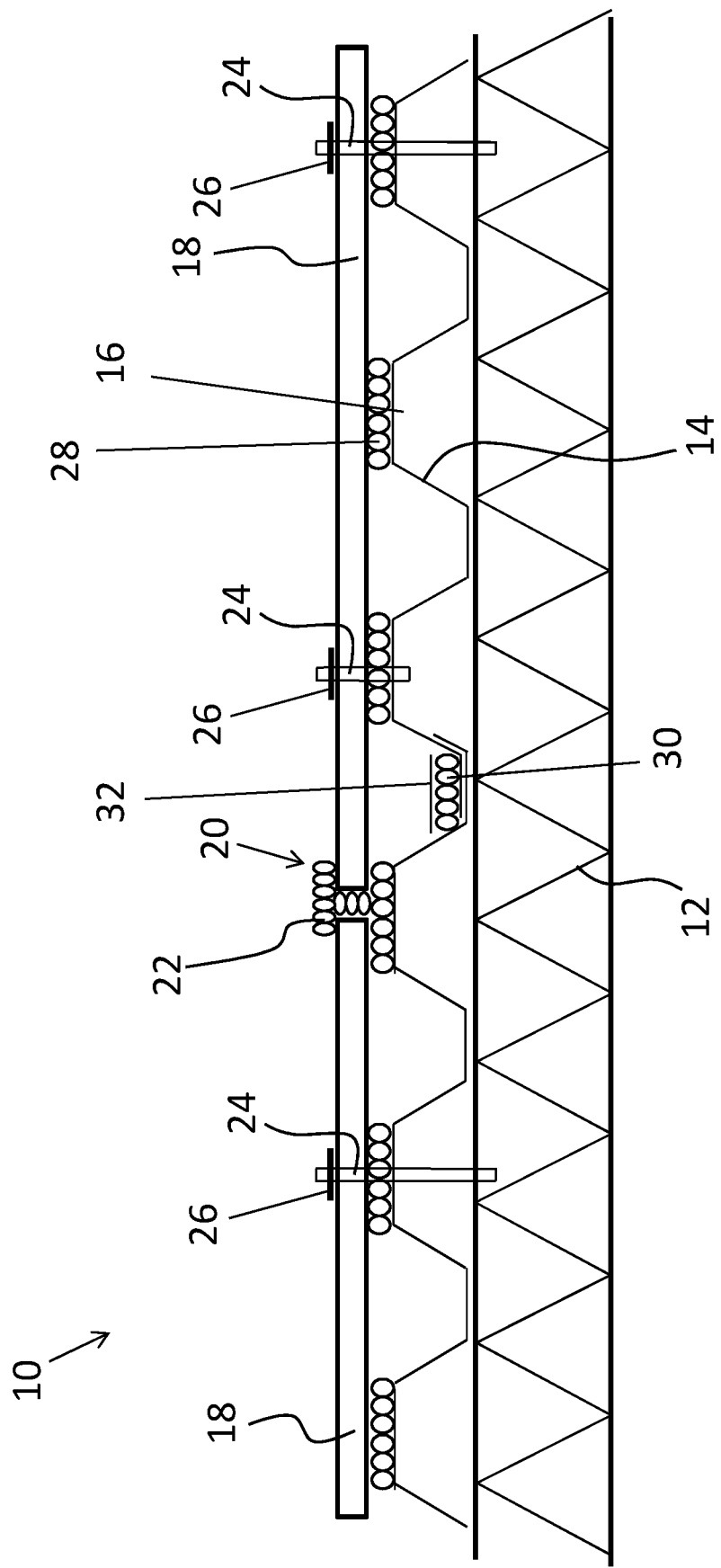
FIG. 5 is a cross-sectional view of another roof system according to an embodiment.

With reference now to FIG. 5, the deck 14 of the roof system 10 may be sealed causing the deck 14 to act as an air barrier. To seal the deck 14, a sealant 30, such as the same sealant or a different sealant than that used to seal the joints 20 between adjacent panels of cover board 18, is positioned at the joints formed between adjacent pieces of deck 14. In some embodiments, the sealant 30 is additionally installed adjacent the holes formed by installation of the fasteners 24. Positioned in overlapping arrangement with the sealant 30 is a piece of fabric 32. Although the fabric 3:2 is illustrated as being positioned upwardly adjacent the sealant 30, embodiments where the fabric 32 is arranged directly adjacent the deck 14 and the sealant 30 is applied thereto are also contemplated herein. In some embodiments, insulation (not shown) may be arranged at the overlapping flutes between the deck 14 and the weighted cover board 18.

The sealant 30 and fabric 32 may be used in addition to or as an alternative to any of the previous embodiments described herein. Accordingly, although the system of FIG. 5 is illustrated as including a sealant 22 between the joints 20 of the cover board 18, an adhesive 28 between the cover board 18 and the deck 14, and a plurality of fasteners 24, the sealant 30 and fabric 32 may be applied to any of the previous roof systems 10 described herein to form an air barrier.

Figure 6:
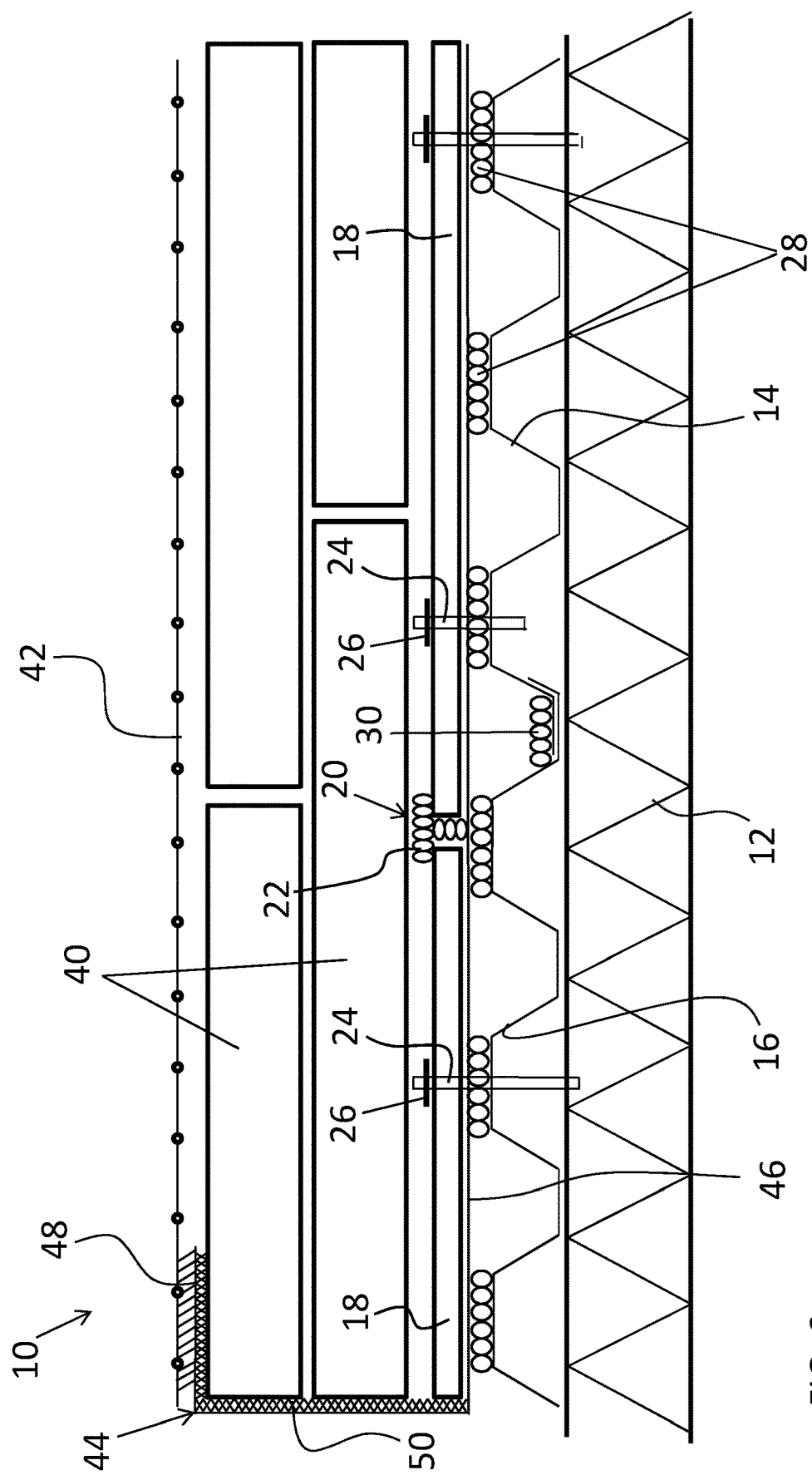
FIG. 6 is a cross-sectional view of another roof system according to an embodiment.

Further, each of the roof systems 10 illustrated in FIGS. 1-5, is described in its simplest form. It should therefore be understood that each of the systems 10 may additionally include other layers commonly used in conventional roofing systems. For example, one or more layers of insulation 40 may be positioned above the upper surface of the weighted cover board 18, as shown in FIG. 6. The insulation 40 may be "loose laid" and therefore, is not mechanically fastened to the adjacent weighted cover hoard 18. The insulation 40 may be formed from polyisocyanurate or expanded or extruded polystyrene as well as other insulating materials common to the roofing industry. Although two layers of insulation 40 is illustrated in the FIG., embodiments including a single layer of insulation 40 or more than two stacked layers of insulation 32 are within the scope of the invention. In embodiments having more than one layer of insulation 40 adjacent layers may be locally attached to one another, such as with an adhesive, liquid nail, or spray foam for example.

Alternatively, or in addition, the roof system 10 may include a waterproofing membrane 42 positioned as the upper most surface of the rood system 10. The membrane 42 may be made of ethylene propylene diene monomer (EPDM), chlorosulfonated polyethylene (CSPE), polyvinyl chloride (PVC) or other similar roof waterproofing single ply membranes. The system may additionally include other layers commonly used in conventional roofing systems. For example, a vapor barrier adhesive (not shown) may be positioned between the deck 14 and the cover board 18 or between the cover board 18 and the adjacent insulation 40 to minimize the diffusion of moisture into the building through the roof system. In addition, flashing, or thin pieces of generally impervious material, may be installed over a portion or all of the waterproofing membrane to form a weather resistant barrier and prevent water from passing into the roof system 10.

In the non-limiting embodiment illustrated in FIG. 6, alternatively, or in addition to the sealant 30 and fabric 32 arranged at the overlapping flutes 16, the adhesive 28, the sealant 22, and/or around the fasteners 24, the system 10 includes a shaped component 44 to form an air barrier adjacent the deck 14. The shaped component 44 has a first end 46 positioned generally adjacent the deck 14, such as between the deck 14 and the cover board 18 for example. In an embodiment, the shaped component 44 is a bent piece of sheet metal. The shaped component 44 may be J-shaped such that the first end 46 covers the substantial entirety of the upper surface of the deck 14. In another embodiment, the shaped component 44 may be C or U-shaped such that the first end 46 covers only a portion of the upper surface of the deck 14. The second end 48 of the shaped component 44 is arranged generally parallel to the first end 46 and is separated therefrom by one or more layers of an additional material, including but not limited to insulation 40, as shown in FIG. 6. In an embodiment, a protective coating or material 50, such as butyl gum rubber or other suitable materials for example, is applied to an interior surface of the shaped component 44.

A waterproofing membrane 42 may be used to seal the second end 48 of the shaped component 44 to the top of the roof structure. Particularly in embodiments where the deck 14 or the shaped component 44 has a coating applied thereto, inclusion of the waterproofing membrane 42, in combination with the shaped component 44, forms a protective air and water barrier that functions to encapsulate the insulation 40 within the roof system 10.

Figure 7:
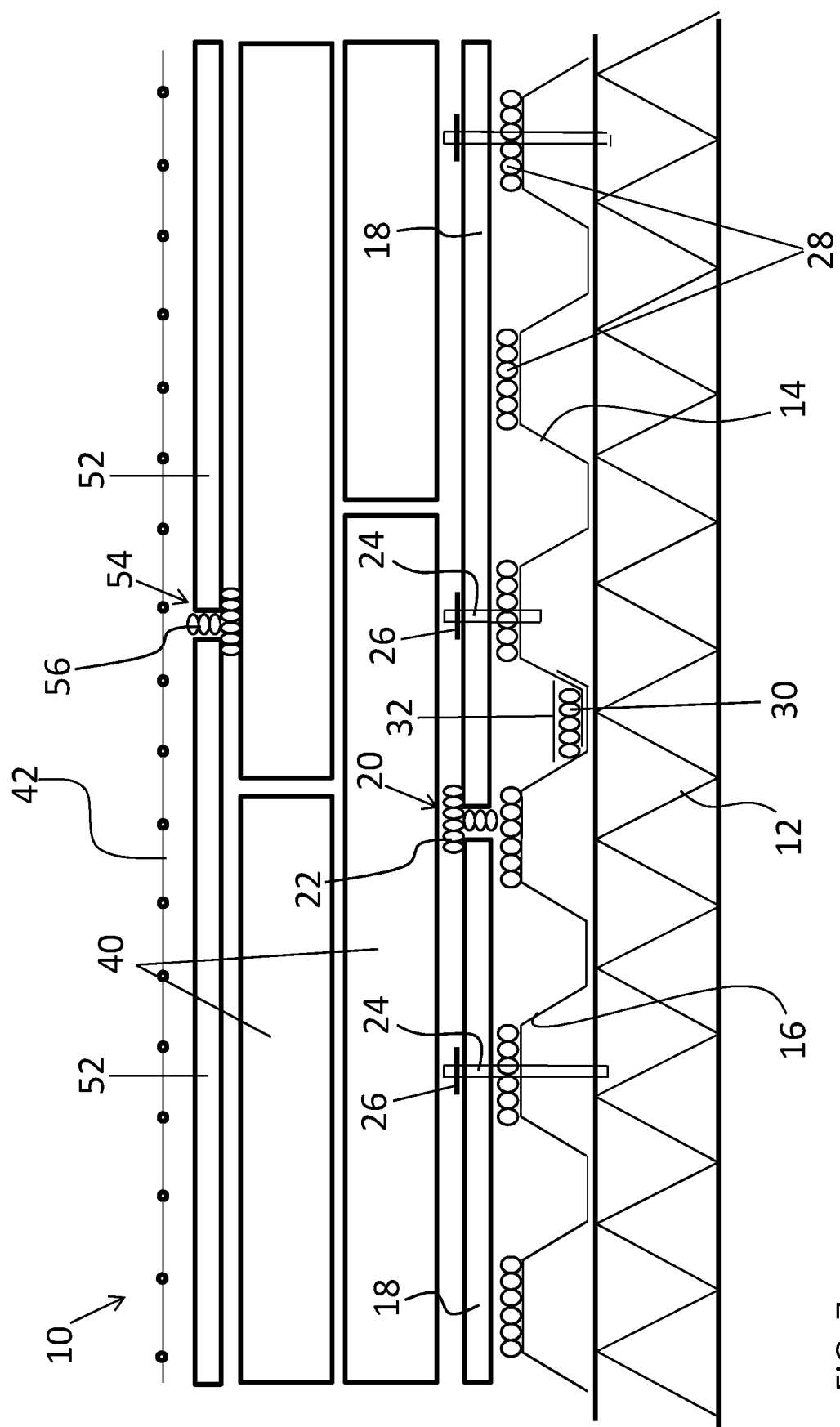
FIG. 7 is a cross-sectional view of another roof system according to an embodiment.

With reference now to FIG. 7, regardless of the configuration of the weighted cover board 18 and whether it includes sealant, or is connected to the deck 14 with adhesive 28, or fasteners 24, in an embodiment, a secondary layer of weighted cover board 52 may be positioned upwardly adjacent the one or more layers of insulation 40. A person having ordinary skill in the roofing art will recognize that this application does not require the use of an adhesive material between the insulation 40 and the weighted cover board 52. Similar to the weighted cover aboard 18 adjacent the deck 14 as described with respect to FIG. 1, the joints 54 formed in the layer of cover board 52 disposed vertically above the insulation 40 may be sealed with a sealant 56. The sealant 56 may be any suitable type of sealant, including a silicon roof coating for example. In an embodiment, the sealant 56 blocks the flow of air through the joints 54 between adjacent pieces of cover board 52. In embodiments where the cover board 52 is formed from a waterproof material, such as Kelly Green Board for example, sealing the joints 54 additionally blocks the flow of water into the roof system 10.

While the invention has been described in detail in connection only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A roof system, comprising:
   a truss;
   a roof deck connected to the truss;
   a layer of water-resistant weighted cover board including at least one panel of weighted cover board disposed upwardly adjacent the roof deck in direct contact with a surface of the roof deck, wherein the at least one panel of weighed cover board does not include a layer of insulation;
   an adhesive material arranged in direct contact with the roof deck and a surface of the at least one panel of weighted cover board to couple the at least one panel of weighted cover board to the surface of the roof deck;
   a plurality of fasteners coupling the at least one panel of weighted cover board to the roof deck, wherein at least one of the plurality of fasteners couples the at least one panel of weighted cover board directly to the truss and at least one of the plurality of fasteners does not extend to the truss,
   a plurality of washers associated with the plurality of fasteners, wherein the at least one of the plurality of fasteners that couples the at least one panel of weighted cover board directly to the truss extends through only a washer of the plurality of washers, the at least one panel of weighted cover board, the roof deck, and the truss;
   wherein the layer of weighted cover board forms an air barrier above the roof deck.

2. The roof system of claim 1, wherein the plurality of fasteners comprise a plurality of self-tapping screws.

3. The roof system of claim 1, wherein the roof deck comprises a plurality of fluted panels arranged in an overlapping relationship and the plurality of fasteners extend through upper flutes of the plurality of fluted panels.

4. The roof system of claim 1, further comprising a plurality of washers, the plurality of washers being positioned between the plurality of fasteners and the at least one panel of weighted cover board.

5. The roof system of claim 1, wherein the roof deck is positioned upwardly adjacent the truss.

6. The roof system of claim 1, wherein the weighted cover board forms a fire barrier of the roof system.

7. A method of forming a roof system, comprising:
   installing a roof deck coupled to a truss;
   positioning a layer water-resistant weighted cover board including at least one panel of weighted cover board upwardly adjacent to and in direct contact with the roof deck, wherein the at least one panel of weighed cover board does not include a layer of insulation;
   coupling the at least one panel of weighted cover board to a surface of the roof deck by arranging an adhesive material in contact with a surface of the at least one panel of weighted cover board and an upper surface of the roof deck; and
   fastening the at least one panel of weighted cover board to the roof deck with a plurality of fasteners and a plurality of washers, wherein at least one of the plurality of fasteners fastens the at least one panel of weighed cover board directly to the truss and at least one of the plurality of fasteners does not extend to the truss, wherein the at least one of the plurality of fasteners that couples the at least one panel of weighted cover board directly to the truss extends through only a washer of the plurality of washers, the at least one panel of weighted cover board, the roof deck, and the truss;
   wherein the layer of weighted cover board forms an air barrier.

8. The method of claim 7, wherein the roof deck includes a plurality of fluted panels arranged in an overlapping relationship, and fastening the at least one panel of weighted cover board to the roof deck includes extending the plurality of fasteners through upper flutes of the plurality of fluted panels.

9. The method of claim 7, further comprising positioning a plurality of washers between the plurality of fasteners and the at least one panel of weighted cover board.

10. The method of claim 7, further comprising positioning the roof deck upwardly adjacent the truss.

11. The method of claim 10, wherein the roof deck is positioned directly adjacent an upper surface of the truss.

* * * * *